Jan. 9, 1951     C. I. HANSEN     2,537,408
AUTOMATIC TOASTER
Filed Aug. 8, 1947     2 Sheets-Sheet 1

Inventor

Carl I. Hansen

By Clarence A. O'Brien
and Harvey B. Jacobson
Attorneys

Jan. 9, 1951 C. I. HANSEN 2,537,408
AUTOMATIC TOASTER
Filed Aug. 8, 1947 2 Sheets—Sheet 2
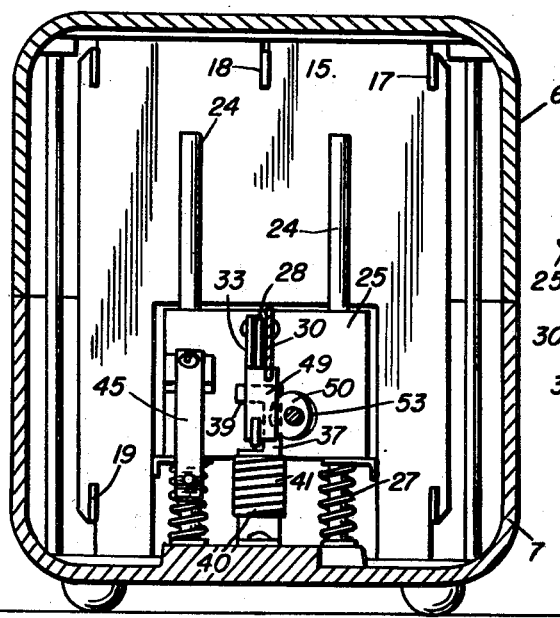
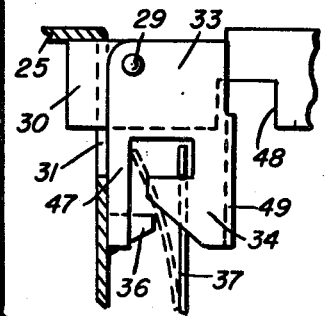
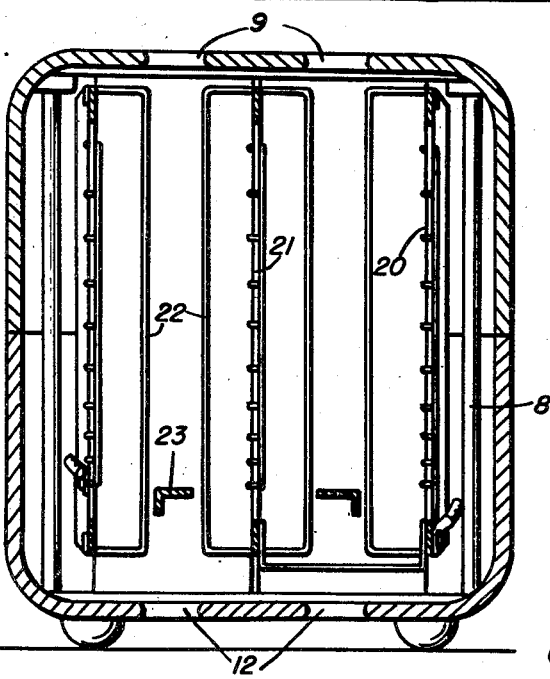
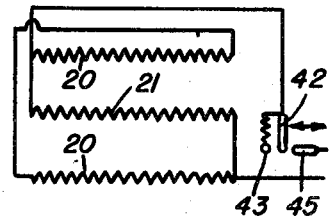
Inventor
Carl I. Hansen
By *Clarence A. O'Brien and Harvey B. Jacobson*
Attorneys Patented Jan. 9, 1951

2,537,408

UNITED STATES PATENT OFFICE 2,537,408

AUTOMATIC TOASTER

Carl I. Hansen, Lynn, Mass., assignor to McGraw Electric Company, Elgin, Ill., a corporation of Delaware Application August 8, 1947, Serial No. 767,383

9 Claims. (Cl. 99—329)

The present invention relates to new and useful improvements in bread toasters and more particularly to an automatic electric toaster.

An important object of the invention is to provide means by which bread may be toasted to any desired crispness by a thermostatically controlled timing mechanism and upon completion of the toasting operation to automatically eject the toast.

Another object of the invention is to provide means by which the bread may be manually ejected.

A still further object of the invention is to provide means by which the electric heating element for the toaster is cut off when the toast is automatically ejected.

Another object is to provide an apparatus of this character of simple and practical construction, which is neat and attractive in appearance, efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
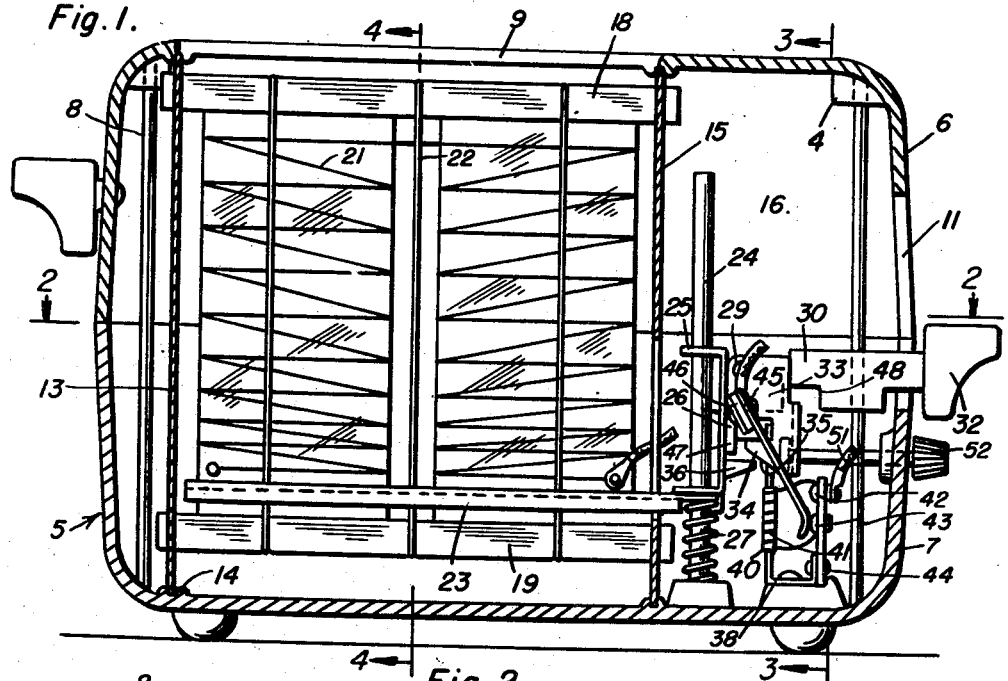
Figure 1 is a longitudinal sectional view.
Figure 2:
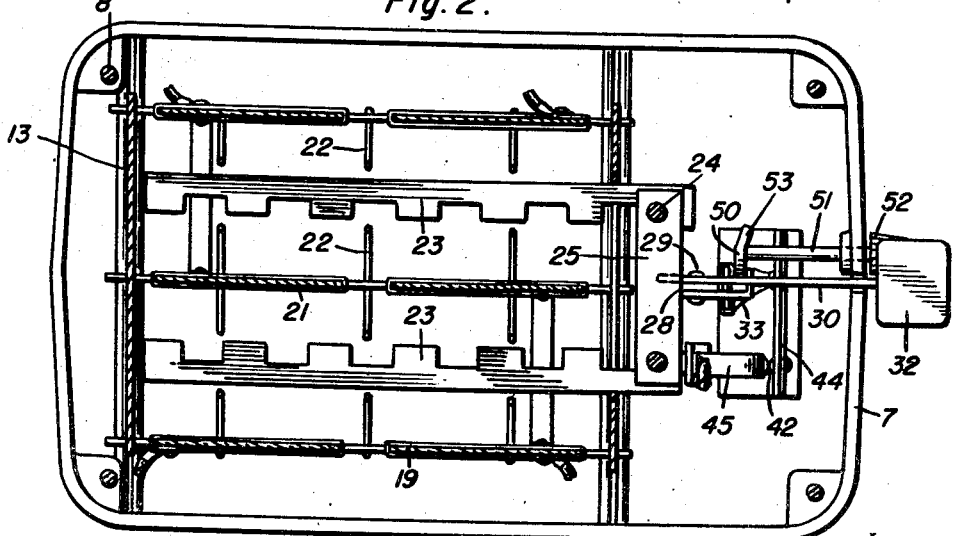
Figure 2 is a horizontal sectional view taken on a line 2—2 of Figure 1.

Figures 3 and 4 are transverse sectional views taken respectively on the lines 3—3 and 4—4 of Figure 1;

Figure 5 is an enlarged fragmentary detail of the thermostatically controlled latch means for the ejecting slide; and Figure 6 is a diagram of the electric circuit for the toaster.

Referring now to the drawings in detail wherein for the purpose of illustration I have disclosed a preferred embodiment of the invention, the numeral 5 designates the casing of the toaster generally and which comprises upper and lower casing sections 6 and 7 connected in assembled relation one above the other by means of vertically extending screws 8 extending upwardly through the lower section 7 and threaded into bosses 4 in the upper section 6.

The top section 6 of the casing is provided with a pair of slots 9 for receiving bread to be toasted and one end of the upper section 6 of the casing is formed with a vertical slot 11 for a purpose more fully hereinafter explained. The bottom section 7 is formed with a slot 12 for emptying bread crumbs from the casing.

A transverse partition 13 has its upper and lower edges supported in internal grooves 14 in the top and bottom sections of the casing at one end of the slot 9 and a similar transverse partition 15 is similarly supported in the casing at the other end of the slots 9 and spaced from the adjacent end of the casing to provide a chamber 16 therein for housing the operating mechanism of the toaster.

The upper and lower edges of the partitions 13 and 15 are formed with vertically extending slots 17 in which the upper and lower frames 18 and 19 of a pair of side heating elements 20 and a central heating element 21 are supported to provide a pair of the heating elements for each of the slots 9 as shown in Figure 4 of the drawings. Wire grids 22 are provided for each of the heating elements to prevent contact of the slices of bread with the heating element. The grids 22 form narrow vertical chambers below each of the slots 9 in the top of the casing for receiving the bread to be toasted and bread supports 23 are positioned in the bottoms of the chambers with one end thereof sliding vertically in an opening 15a in the partitions 15.

A pair of guide posts 24 are supported in an upright position in the compartment 16 and on which the flanges 25 of a channel-shaped slide 26 are slidably mounted, one end of the bread supports 23 being suitably secured to the lower flange of the slide for movement therewith. Coil springs 27 are mounted on the posts beneath the slide for raising the slide and the bread supports.

An arm 28 projects horizontally from the slide 26 and is provided with a pin 29 on which the inner end of a lever 30 is pivoted at one side of the arm, the inner end of the lever projecting through a vertical slot 31 in the slide for positioning under the upper flange 25 thereof. The outer end of the lever 30 projects outwardly through the slot 11 and is provided at its outer end with a handle or finger grip 32.

A latch plate 33 is also pivoted at its upper inner corner on the pin 29 at the side of the arm 28 opposite from the lever 30 and is formed at its lower edge with an inwardly projecting dog 34 having a beveled lower edge 35. A second latch 36 projects rearwardly from the slide 26 adjacent its lower portion below the latch dog 34 and offset from the plane thereof, the ends of the latch dog 34 and latch 36 overlapping as shown in Figure 5 of the drawings.

A thermostat 37 constructed of a suitable bimetallic material and of flat construction is provided at its lower end with the horizontal attaching plate 38 which is secured in the bottom of the casing and supported in an upright position at one side of the latch dog 34. The vertical side edge of the thermostat adjacent the latch dog 34 is formed with a notch 39. The lower portion of the thermostat 37 is enclosed in an insulated casing 40 and around which is coiled a heating coil 41 with its ends connected to upper and lower contacts 42 and 43 secured in vertically spaced relation on a suitable insulated support 44.

A resilient contact arm 45 is connected at its upper end to the slide 26 by an insulation block 46 and extends downwardly therefrom in wiping contact with the contacts 42 and 43 upon the vertical movement of the slide.

The contact 42 for one end of the coil 41 and the heating elements 20 and 21 are connected in a circuit with the resilient contact arm 45 which functions as a switch arm controlling the circuit.

In the operation of the device, the bread supports 23, slide 26 and lever 30 are normally held in a raised position by the coil springs 27 and after bread has been inserted in the slots 9 for resting on the bread supports 23, the handle 32 is moved downwardly, thereby lowering the lever 30, slide 26 and bread supports 23 into the position shown in Figure 1 of the drawings. The downward movement of the lever 30 also moves the latch plate 33 downwardly to cause the latch dog 34 to ride over the upper edge of the thermostat 37 to engage in the notch 39 whereupon the slide 26 and bread supports 23 are held in their lowered position.

The downward movement of the slide 26 also carries the contact arm 45 downwardly for engagement with the lower contact 43 when the bread supports and slide are held in their lowermost position to thus close the circuit with the coil 41 and heating elements 20 and 21 to toast the bread.

The heating of the thermostat 37 causes the same to bend away from the latch dog 34 as shown by the dotted lines in Figure 5 of the drawing to release the latch dog 34 and at the same time to engage the latch 36 in the notch 39 of the thermostat and permit a slight upward movement of the latch plate 33, slide 26 and bread supports 23 and to move the contact arm 45 away from the contact 43 and into engagement with the contact 42. The coil 41 is thus deenergized to permit cooling of the thermostat and at the same time maintain the circuit for the heating elements 20 and 21 closed to continue toasting of the bread.

As the thermostat 37 cools the same assumes its upright position to release the latch 36 thereby causing an upward movement of the slide 26 and bread supports 23 by the springs 27 and to eject the toasted bread through the slots 9. Provision is also made for manually releasing the mechanism from a lowered position to eject the toast at any period of the toasting operation and comprises a tongue 47 extending downwardly from the rear edge of the latch plate 33 and spaced rearwardly from the latch dog 34, the tongue bearing against the upper edge of the thermostat 37 when the latter is bent from its perpendicular position after being subjected to heat.

The lower edge of lever 30 is provided with notch 48 to receive the upper edge of vertical flange 49 at the front edge of latch 33 whereby an upward movement of lever 30 by handle 32 will swing latch plate toward the right and move the upper end of the thermostat 37 clear of the latch 36 to thus release the slide 26 and bread supports 23 for raising movement. Should it be desirable to eject the toast manually while the latch dog 34 is still held downwardly by the thermostat the outward swinging movement of the latch plate 33 will likewise release the latch dog 34 from the thermostat.

In order to regulate the timing of the toasting period I provide a cam disc 50 positioned behind the flange 49 and secured at the inner end of a shaft 51 which is journaled in the adjacent end wall of the casing and provided at its outer end with a manipulating knob 52. By turning the knob 52 the cam 50 will be rotated to bring its high lobe 53 into engagement with the flange 49 to thus swing the latch plate 33 away from the thermostat 37 and thus reduce the lapse of time for releasing the latch dog 34 from the thermostat.

Likewise, the adjustment of the cam 50 will move the tongue 47 of the latch plate toward the right and likewise reduce the lapse of time for freeing the thermostat from the latch 36 during the cooling period of the thermostat.

In view of the foregoing description taken in conjunction with the accompanying drawing it is believed that a clear understanding of the device will be quite apparent to those skilled in this art. A more detailed description is accordingly deemed unnecessary.

It is to be understoood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. In an automatic bread toaster, a spring actuated ejector, a pair of latch members carried by the ejector, said latch members being spaced one above the other, the uppermost latch being pivoted and the lowermost latch being fixed, a bi-metallic latch element disposed in the path of the upper latch upon a retracting movement of the ejector to lock the ejector in its retracted position, said latch element being thermostatically responsive to temperature conditions for swinging movement to release the upper latch and to engage the lower latch to permit the ejector to raise slightly and to release the lower latch to permit the ejector to be biased upwardly through its complete travel path, an electric heating element for the bi-metallic latch element, a switch for said heating element and controlled by said ejector to deenergize the heating element upon initial raising movement of the ejector to restore the latch element to its original position and to release the lower latch, a manually operated lever pivoted to the ejector for moving the ejector into its retracted position by a downward movement of the lever, means carried by the lever engaging and releasing the upper latch from the bi-metallic latch element, and means carried by the upper latch releasing the bi-metallic latch element from the lower latch, both of said means being operable by a manual raising movement of the lever.

2. A toaster comprising a casing having a heating element therein and an opening for receiving bread to be toasted, a spring actuated bread ejector beneath the opening, a circuit closer for the heating element movable with the ejector to energize said heating element upon a retracting movement of the ejector, means automatically locking the ejector in its retracted position and releasing the ejector for raising movement to a partially ejected position, and including a pair of latch members having overlapping portions, said latch members carried by the ejector, a bimetallic latch element having a notched portion for successively engaging said overlapping portions for successively retaining said ejector in each of said retracted and partially rejected positions.

3. A toaster comprising a casing having a heating element therein and an opening for receiving bread to be toasted, a spring actuated bread ejector beneath the opening, a circuit closer for the heating element movable with the ejector to energize said heating element upon a retracting movement of the ejector, and means automatically locking the ejector in its retracted position and releasing the ejector for raising movement, and including latch members carried by the ejector providing detent steps spaced apart in the direction of movement of the ejector, a bi-metallic latch member for engaging said steps separately, and a heating coil for said bi-metallic member, said bi-metallic member, when cold, engaging one of said steps for holding the ejector in retracted position, said bi-metallic member deflecting when heated to disengage said one step and move into the path of the other step, said bimetal, upon cooling, deflecting in the opposite direction to disengage said other step and thereby release said ejector.

4. In an automatic toaster, a bread carrier biased toward non-toasting position and movable therefrom to toasting position, mechanism for holding said carrier in said toasting position and for releasing it therefrom comprising, detent members on said carrier providing two overlapping, opposed latch-steps spaced apart in the direction of motion of said carrier, a latch having a step-engaging portion for engaging said steps separately and a temperature-responsive portion for moving said step-engaging portion laterally of the direction of motion of said carrier in response to changes of temperature, and means for heating and cooling said temperature-responsive portion, said step-engaging portion engaging the first step when said temperature-responsive portion is cool, deflecting, when said temperature-responsive portion is heated, to disengage said first step and move into the path of the second step for thereby engaging it, and deflecting in the opposite direction when said temperature responsive element cools, to disengage said second step and thereby release said carrier.

5. The combination of claim 4 wherein there is included manual release means comprising a member for engaging said latch and mechanically deflecting said step engaging portion in said opposite direction, and comprising also a member for moving said first step in said opposite direction for disengaging it from said latch.

6. In an automatic electric toaster having a movable bread carrier, operating and control means including a temperature responsive member, said means being operable in response to heating of said member to move said carrier from a first toasting position to a second toasting position and operable in response to cooling of said member to move said carrier to a non-toasting position, said toaster having also a toasting heater, and a second heater for said temperature responsive member connected in series with said toasting heater, the improvement wherein there is included a first switch contact carried by said carrier, second and third switch contacts over which said first contact wipes, said second heater being connected between said second and third contacts, said toasting heater being connected to said third contact, said contacts being so located that said first contact engages said second contact when said carrier is in said first toasting position for energizing both said heaters, and engages said third contact only when said carrier is in said second toasting position for energizing only said toasting heater.

7. In an automatic bread toaster, a bread carrier biased upward to a non-toasting position and movable down therefrom to a toasting position, detent means on said carrier providing two opposed latch steps, one slightly above the other, a latch having a detent part for engaging said steps separately for holding said carrier in toasting position and a thermal part operable in response to heating and cooling for moving said detent part horizontally to disengage said steps, said detent part disengaging the upper step to let the carrier move and engaging the lower step to hold it in response to heating, and then disengaging said lower step to release said carrier in response to cooling, switch and heater means controlled by movement of said carrier for heating said thermal part, a handle on said carrier having limited up and down movement thereon, means permitting lateral movement of one of said steps on said carrier for disengaging said latch, a pusher movable against said detent part for mechanically moving said detent part in the direction to disengage the other step, and mechanism operable by an upward movement of said handle on said carrier for causing said movement of said one step and said pusher.

8. The combination of claim 7 wherein said handle is pivoted on said carrier, wherein a pivoted member carries the upper step and also carries said pusher for moving the detent part of the latch off the lower step and can swing for releasing said carrier from either or both said steps, and wherein said handle is operable to so swing said pivoted member in response to an upward movement thereof relative to said carrier.

9. The combination of claim 8 wherein said pivoted member is rigid and pivoted on said carrier coaxially with said handle, and wherein there is lost motion between said handle and pivoted member permitting said pivoted member and said upper step to be deflected around said detent part of said latch when said handle is pushed down to lower said carrier to toasting position.

CARL I. HANSEN.

REFERENCES CITED

The following references are of record in the file of this patent:

UNITED STATES PATENTS

| Number | Name | Date |
| --- | --- | --- |
| 1,988,230 | Avery | Jan. 15, 1935 |
| 2,234,759 | Graham | Mar. 11, 1941 |
| 2,250,997 | Miller | July 29, 1941 |
| 2,285,156 | Gomersall | June 2, 1942 |
| 2,302,117 | Gomersall | Nov. 17, 1942 |
| 2,303,561 | Koci | Dec. 1, 1942 |
| 2,320,347 | Brosseau et al. | June 1, 1943 |
| 2,344,842 | Weeks | Mar. 21, 1944 |
| 2,362,751 | Huck | Nov. 14, 1944 |
| 2,389,927 | Parr | Nov. 27, 1945 |
| 2,436,735 | Walder et al. | Feb. 24, 1948 |
| 2,446,935 | Kreer | Aug. 10, 1948 |